Aug. 15, 1933.  A. BRIGGS  1,922,273
MAGNETIC FLUID GAUGE
Filed May 13, 1932
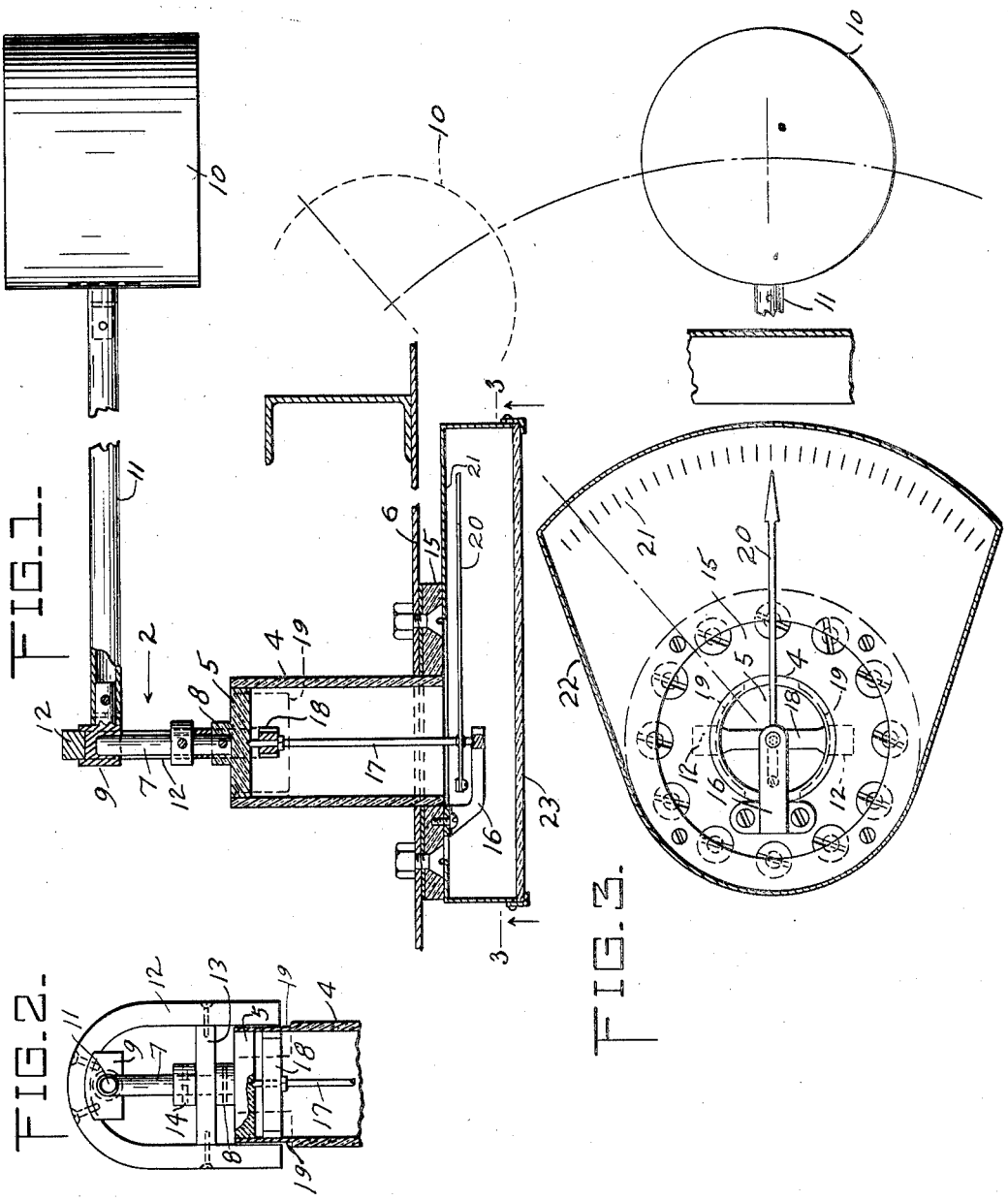
INVENTOR
*Albert Briggs*
BY
ATTORNEY Patented Aug. 15, 1933

1,922,273

UNITED STATES PATENT OFFICE 1,922,273

MAGNETIC FLUID GAUGE

Albert Briggs, Vallejo, Calif.

Application May 13, 1932. Serial No. 611,183

2 Claims. (Cl. 73—82)

(Granted under the Act of March 3, 1883, as amended April 30, 1928; 370 O. G. 757)

This invention relates to a gauge for indicating the depth of fluid in a container and more particularly to one in which the movement of a float in the container is transmitted to an indicating pointer magnetically instead of mechanically.

It is the object of this invention to provide a device of the class described that has no mechanical connection between the float and the pointer and thus avoids the necessity of a member passing through the wall of the container around which the fluid may leak, and at the same time will be accurate in its action and simple in construction.

With the above and other objects in view, the invention consists in the construction, combination and arrangement of parts as will be described more fully hereinafter.

In the drawing:

Fig. 1 is a plan view of the assembly of my invention with cooperating parts of the container structure in section;

Fig. 2 is a detail view showing the relative positions of the magnets used, looking in the direction of arrow 2, Fig. 1;

Fig. 3 is a detail view of the indicating pointer and associated parts, as seen from line 3—3, Fig. 1.

A sleeve 4 having a fluid-tight closure 5 at its inner end is set into a readily accessible portion of the wall of a container 6. Post 7 has one end secured in a socket 8 on closure 5 and has a hub 9 rotatably mounted on its other end. Float 10 is carried at the outer end of float arm 11 which has its inner end fixed to hub 9. Horseshoe magnet 12 is fitted over hub 9 substantially at right angles to arm 11 and is secured to the hub in any suitable manner. Post 7 passes through an aperture in transverse tie member 13 that has its ends secured to the limbs of magnet 12 and a collar 14 is secured to the post on the outer side of tie member 13 to assist in keeping the magnet properly positioned.

Plate 15 is secured to container 6 around sleeve 4 and carries a bracket 16. Pin 17 is rotatably mounted with its end journalled in suitable bearings in closure 5 and in bracket 16. Mounted on pin 17 to rotate therewith is a bar magnet 18 disposed with its poles aligned respectively with the opposite poles of the horseshoe magnet 12. The reluctance between the two magnets is decreased by cutting out part of the sleeve 4 over an arc large enough to permit the magnet 12 to execute the desired degree of rotation, as indicated at 19. An index or pointer 20 is also carried by pin 17 to rotate therewith and be moved over scale 21 on the lower side of casing 22 as arm 11 is moved up or down by changes in the level of the fluid in container 6. The outer side of casing 22 is closed by a glass cover plate 23.

It is apparent that rotation of magnet 12 by movements of arm 11 will impart accurately corresponding rotation to magnet 18 by the mutual attraction of the two magnets and hence will cause index 20 to traverse scale 21 and indicate the relative level of the surface of the fluid in container 6. Due to the small separation of the poles of magnets 12 and 18 and the further reduction of the reluctance of the magnetic circuit by the presence of the magnetic metal of sleeve 4 between the poles of the two magnets there is very small loss of magnetic energy and a strong torque will be exerted upon magnet 18 by magnet 12 and the movements of the latter will be substantially identically followed by the former. There being no mechanical connection between arm 11 and pin 17 it is not necessary to have perforations through the container 6 to couple the mentioned parts together and therefore the possibility of leakage through packing around a moving element is obviated.

It will be understood that the above description and accompanying drawing comprehend only the general and preferred embodiment of my invention, and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalty thereon.

I claim:

1. In a fluid level gauge, a float, an arm attached thereto, a post on which one end of said arm is pivotally mounted, a sleeve adapted to extend through and be secured to the wall of a container for fluid, a closure for the inner end of said sleeve, means on the outer face of said closure forming a socket in which an end of said post is secured, a horseshoe magnet mounted to rotate with said arm about said post as an axis, the ends of the limbs of said magnet lying in cut away portions in the outer face of said sleeve at the inner end thereof, a bar magnet in said sleeve disposed with its poles adjacent the respective opposite poles of the horseshoe magnet, a pin on which said bar magnet is mounted to rotate therewith, said pin having one end journalled in said closure, a bracket in which the other end of said pin is journalled, an index secured to said pin to rotate therewith, and a scale over which an end of said index moves to indicate the relative level of the surface of the fluid on which said float is supported.

2. In a fluid level gauge, a float, an arm connected at one end to said float and pivotally mounted at its other end, a horseshoe magnet connected to said arm transversely thereof at said pivoted end, a tubular member adapted to be connected to the wall of a container for fluid to extend into said container, the inner end of said member being closed and lying between the limbs of said magnet, a bar magnet rotatably mounted in said member between the limbs of said horseshoe magnet with its poles adjacent the respective opposite poles of said horseshoe magnet, an index operatively connected to said bar magnet, and a scale over which said index is movable to indicate the surface level of the fluid in said container.

ALBERT BRIGGS.